(12) United States Patent
Hsu

(10) Patent No.: US 7,000,147 B2
(45) Date of Patent: Feb. 14, 2006

(54) RAPID SELF-ERROR-CHECK CIRCUIT OF A COMPUTER POWER SUPPLY

(75) Inventor: Chen-Hsiung Hsu, Hsinchu Hsien (TW)

(73) Assignee: Tekchain Development, Inc., Taoyuan (TW)

( * ) Notice: Subject to any disclaimer, the term of this patent is extended or adjusted under 35 U.S.C. 154(b) by 677 days.

(21) Appl. No.: 10/066,600

(22) Filed: Feb. 6, 2002

(65) Prior Publication Data

US 2003/0149911 A1 Aug. 7, 2003

(51) Int. Cl.
*G06F 11/00* (2006.01)

(52) U.S. Cl. .............................. 714/22; 714/14; 713/340
(58) Field of Classification Search .................. 714/14, 714/22; 713/340
See application file for complete search history.

(56) References Cited

U.S. PATENT DOCUMENTS

| 5,553,294 | A | * | 9/1996 | Nanno et al. | ............... | 713/340 |
| 5,640,574 | A | * | 6/1997 | Kawashima | ............... | 713/340 |
| 5,646,535 | A | * | 7/1997 | Dornier | ...................... | 324/556 |
| 6,275,162 | B1 | * | 8/2001 | Lo et al. | ................. | 340/636.1 |
| 6,574,741 | B1 | * | 6/2003 | Fujimori et al. | ............ | 713/330 |
| 6,625,742 | B1 | * | 9/2003 | Owhadi et al. | ............. | 713/340 |
| 6,772,357 | B1 | * | 8/2004 | Billick et al. | ............... | 713/340 |

OTHER PUBLICATIONS http://www.made–in–china.com/products/show/freemember/prod/zU5NTYM/mic/Computer_Consumer_Electronics_Power_Supply_Special_UPS_fo_PHS_System.html; Feb. 23, 2001.*
http://www.globalsources.com/gsol/GeneralManager?&design=clean&language=en&page=ProductDetail&product_id=100057316&action=GetProduct&action=GetPoint&point_id=3000000149681&catalog_id=2000000003844; 2005.*
http://www.globalsources.com/gsol/GeneralManager?&design=clean&language=en&page=ProductDetail&product_id=100058527&action=GetProduct&action=GetPoint&point_id=3000000149681&catalog_id=2000000003844; 2005.*
http://www.globalsources.com/gsol/GeneralManager?&design=clean&language=en&page=ProductDetail&product_id=100031854&action=GetProduct&action=GetPoint&point_id=3000000149681&catalog_id=2000000003844; 2005.*

* cited by examiner

*Primary Examiner*—Robert Beausoliel
*Assistant Examiner*—Michael Maskulinski
(74) *Attorney, Agent, or Firm*—Troxell Law Office, PLLC

(57) ABSTRACT

A rapid self-error-check circuit of a computer power supply is disclosed, wherein a computer power supply is installed with a self-detecting device; an LED displaying light and detecting button are exposed on the casing of the power supply; thereby, the normality of the power supply can be detected by pressing a detecting button and then the result is displayed through the colors of the LED displaying light.

3 Claims, 3 Drawing Sheets

RAPID SELF-ERROR-CHECK CIRCUIT OF A COMPUTER POWER SUPPLY

BACKGROUND OF THE INVENTION

1. Field of the Invention

The present invention relates to power supplies, and particularly to a rapid self-error-check circuit of a computer power supply.

2. Description of Related Art

A general computer mainframe is installed with a power supply for supplying a steady and reliable voltage to the mainframe. However, current power supplies are often not so reliable. When a computer is shutdown or can not start up, the user often takes much time to find the defects necessary to be repaired. Moreover, many users take the computer for repair while just power supply has faults, but other components are operational.

If a computer can not be operated normally, a power supply is a first one to be detected. However, the fault of the power supply can not be detected from outer appearance. For example, if a plug is inserted into a receptacle while the fan of the power supply is usable, then the user determines that the power supply has no fault. This is incorrect. Moreover, if a computer can not be restarted, the user may consider that the power supply has fault. This is also an error concept, since there are many reasons which induce that a computer can not be restarted, for example, over voltage or over current of other components, protection mode of a power supply induced by an over voltage and over current protecting device.

Whether a power supply can be operated normally can not be determined from the operation of a fan of a power supply. It is also possible that the power supply has no fault, while the fan can not be operated. Therefore, to decide whether a power supply is normal is very important.

The fault of a power supply can be classified as one of exterior faults and interior faults. The former one can be detected from outer side without using any detector, for example by checking whether the output wire or terminal is loose or burned. The way for determining the interior fault is at first to detach a power supply from a computer mainframe. Then, proprietary devices, such as electronic loader, scope, etc., are used to measure all output voltage, current and signals. If they are in normal condition, the fault of the power supply can be not considered.

Some conditions which can not be detected by instruments are not within the scope of the present invention. However, these conditions have a little possibility of occurrence.

SUMMARY OF THE INVENTION

Accordingly, the primary object of the present invention is to provide a rapid self-error-check circuit of a computer power supply, which may detect the fault of a power supply rapidly and then display the result on a LED displaying light so that the user may determine the condition of the power supply.

To achieve the object, the present invention provides a rapid self-error-check circuit of a computer power supply, wherein a computer power supply is installed with a self-detecting device; an LED displaying light and detecting button are exposed on the casing of the power supply; thereby, the normality of the power supply can be detected by pressing a detecting button and then the result is displayed through the colors of the LED displaying light.

The various objects and advantages of the present invention will be more readily understood from the following detailed description when read in conjunction with the appended drawing.

DETAILED DESCRIPTION OF THE PREFERRED EMBODIMENTS

Figure 1:
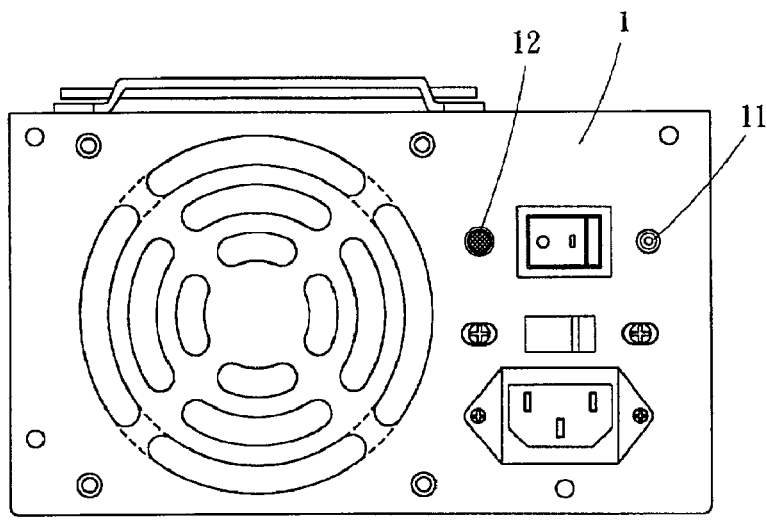
FIG. 1 is a front view of a power supply with a detecting button and a display light of the present invention.

Referring to FIG. 1, the present invention is placed in a power supply with a self-error-check circuit. The power supply 1 is installed behind the computer mainframe 2. An LED displaying light 11 and a detecting button 12 are installed on the housing at an exposed part. Therefore, the user is only necessary to press the button 12, a circuit is used to detect the condition of the power supply 1 and then the result will be displayed by the color variation of the LED displaying light 11.

Figure 2:
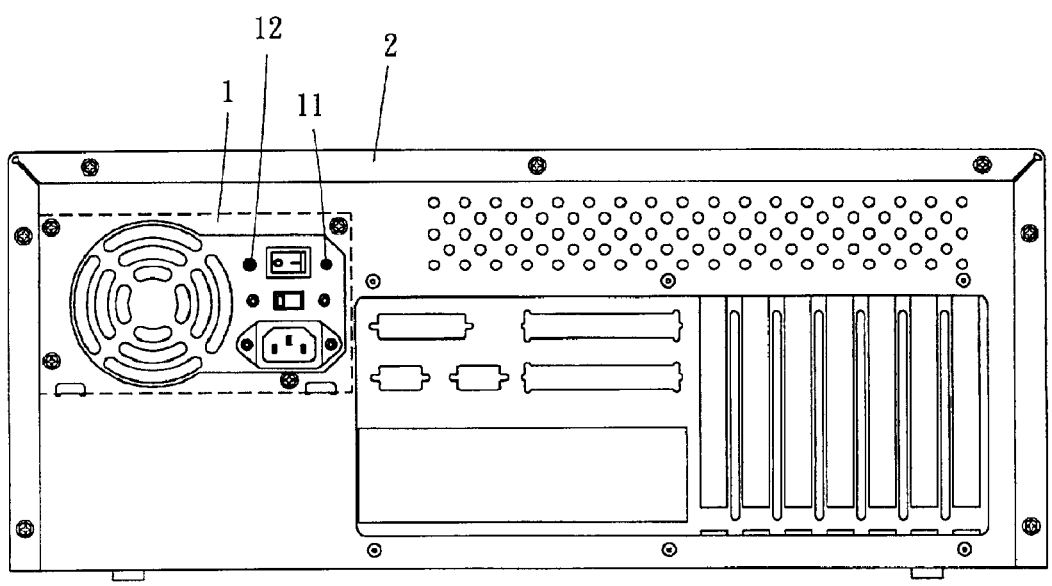
FIG. 2 is a front view showing that the power supply of the present invention is installed to a transversal type computer mainframe.
Figure 3:
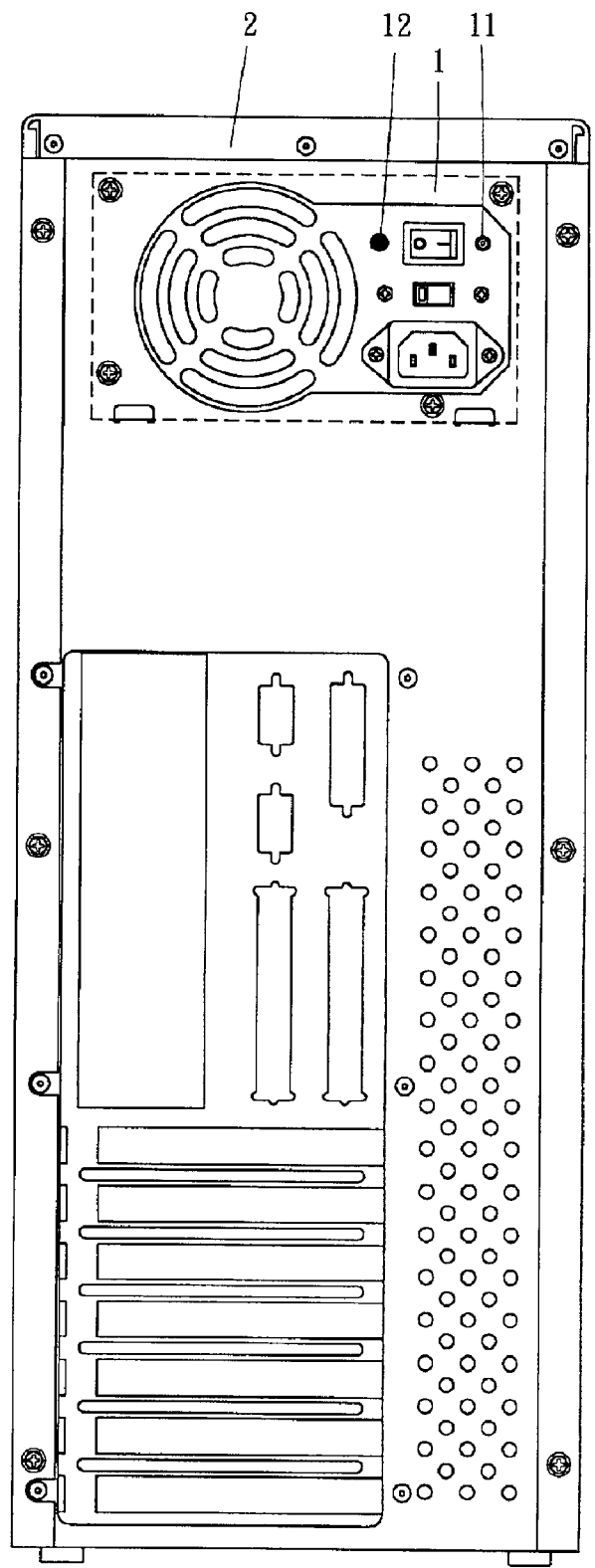
FIG. 3 is a front view showing that the power supply of the present invention is installed to an upright type computer mainframe.

Referring to FIGS. 2 and 3, the computer power supply with self-detecting device of the present invention is illustrated. The computer power supply with self-detecting device is installed on a transversal or upright type computer mainframe 2. The LED displaying light 11 and detecting button 12 are exposed out. Thereby, the user of the computer may see the display condition of the LED displaying light 11 and thus the user may touch the detecting button 12 by a finger.

Figure 4:
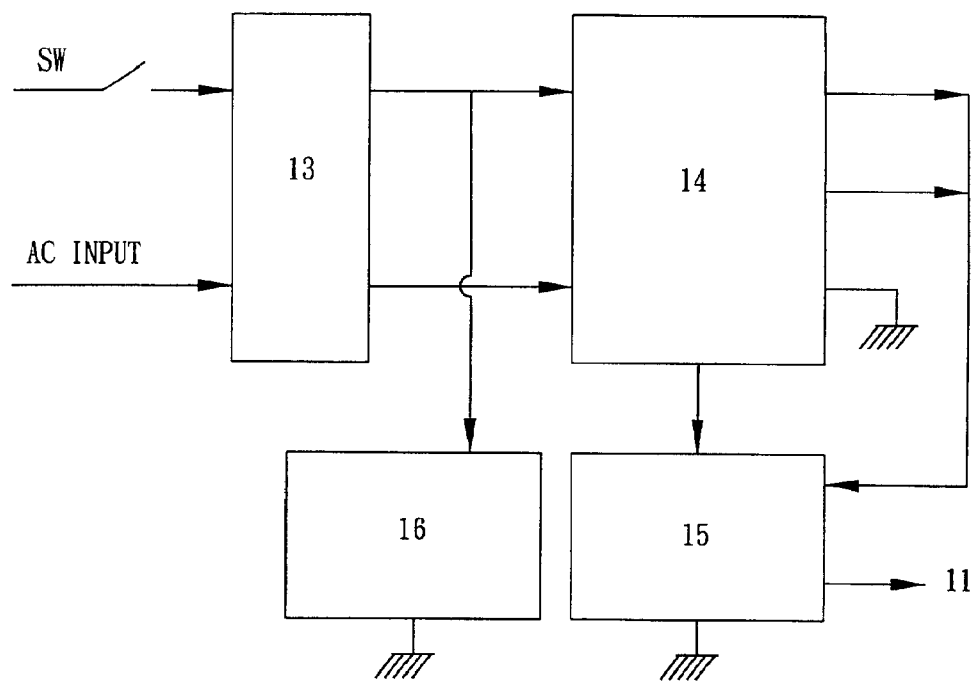
FIG. 4 shows the working principle of the power supply operation detecting circuit of the present invention.
Figure 5:
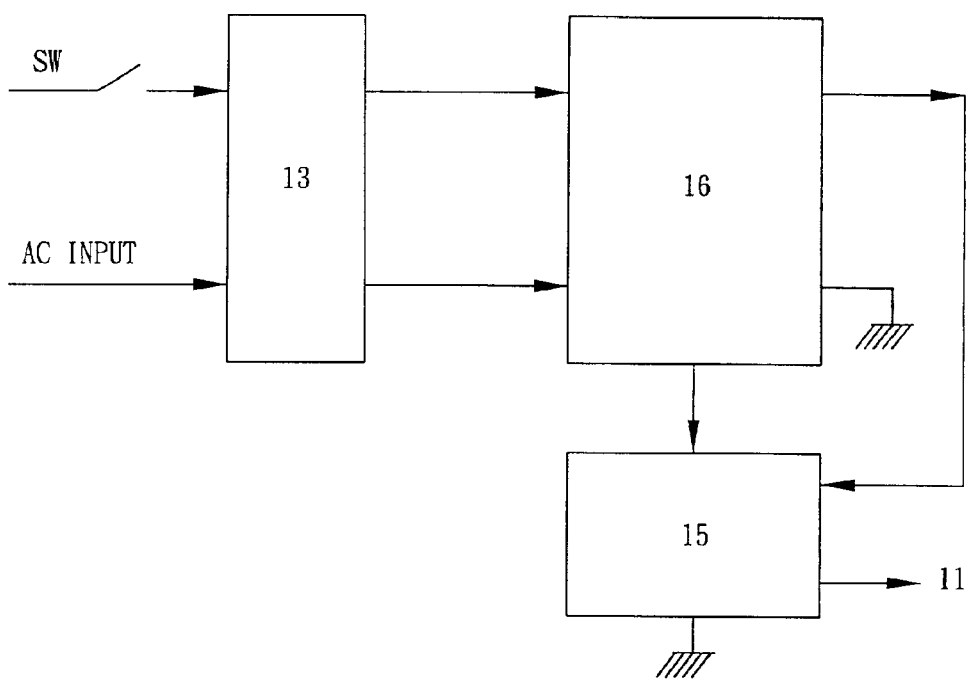
FIG. 5 showing the working principle of the standby power source detecting circuit of the present invention.

The detecting circuit of the computer power supply 1 includes a power supply operation detecting circuit as illustrated in FIG. 4 and a standby power source detecting circuit as illustrated in FIG. 5. In the power supply detecting circuit, a detecting switch SW is used to control the AC current to enter into the power supply 1. After power is rectified by a rectifier 13 and then enters into the power system 14 for reducing the voltage, a voltage signal is sent to a detector 15. An auxiliary power source or standby power source 16 is installed between the rectifier 13 and the power system 14. The detector 15 of the power system 14 is used to detect the power condition of the power system 14 and to detect the output voltage. The detecting result is displayed by the LED displaying light 11.

In above circuit, the LED displaying light 11 includes a standby power source light VSB and a power output light PG. The VSB is a green light and PG is a red light. The combination of the two is indicated by a yellow light. The color of the indicator is changed according to the standby power source and the output voltage of the power source or the variation of the specific signal, which includes the following conditions.

1. In standby condition, a green light of the LED displaying light 11 lights up.
2. If the indicator extinguishes, it represents that the power supply is abnormal, which includes the following condition:
   (1) The power supply circuit of the standby power source has faults
   (2) Overload 3. If a yellow indicator lights up, then the user can not detect by himself, namely:
   (1) Press a detecting button to conduct a detecting switch, yellow light lights up and the green light extinguishes. The power source is normal.
   (2) Press a detecting button, the green lights still lights up. It represent that the power source is abnormal.

Referring to FIG. 5, the present invention is used to detect a standby power source. In the power supply detecting circuit, a detecting switch SW is used to control the AC current which flows into the power supply 1. The current is rectified by the rectifier 13 and then enters into the auxiliary power source or standby power source 16. A voltage signal is outputted to the detector 15. The detector 15 of the auxiliary power source or standby power source 16 may detect the power condition of the auxiliary power source or standby power source 16 directly, and meanwhile may detect the voltage output. The result is displayed on the LED displaying light 11. Only auxiliary power source or standby power source 16 is detected, and thus only green light lights up. The color of the light can be changed according to the output voltage of the auxiliary power source or standby power source or specific signals. The following conditions are included.
1. As a green light lights up, it represents that the auxiliary power source or standby power source is normal
2. As the light is extinguished, it represents no auxiliary power source or standby power source, including the following condition:
   (a) No AC input.
   (b) No fault in power wire.
   (c) When output load is larger than 130%–160%, the detector inform to interrupt power supply (improper load can be removed, and the power is restored).

Above mentioned detector 15, for example power supply used in ATX computer, a standby power supply (VSB) or a PG signal of a power supply can be used as a detecting point. The present invention has a function of intelligent function. When the output load is larger than the setting point for load protection and the power is interrupted for power protection. The load is removed and a detecting button is pressed. If the power source is normal, indicator 11 changed from green light to yellow light. If the detecting button 12 is pressed, while the green light still lights up, then it is determined that the power supply has faults.

The rapid self-error-check circuit of a computer power supply of the present invention has an LED displaying light 11 and a detecting button 12. The user only needs to press the detecting button 12, and then the power supply 1 will detect the condition of the power supply. Then the LED displaying light 11 will display the condition by different colors. Thereby, the user may detect whether the power supply 1 is in normal.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer power supply with a rapid self-error-check circuit, comprising: a self-detecting device; an LED displaying light and detecting button protrude from a casing of the computer power supply; thereby, the normality of the power supply is detected by pressing a detecting button and then the result is displayed through colors of the LED displaying light, the self-detecting device having a power supply operation detecting circuit and a power supply standby power source detecting circuit, wherein the power supply operation detecting circuit includes an AC power input end, a detecting switch, a rectifier, a power system, one of an auxiliary power source and standby power source, and a detector; the detector detects the power condition of a power system, and detects output voltage; the detected result is displayed by the LED displaying light, wherein the LED displaying light includes a light for the standby power source and a light for power output; a light for the standby power supply is green and the light for the power supply is yellow; the color of the light changes according to an output voltage of the standby power source, power supply, and predetermined signals.

2. The rapid self-error-check circuit of a computer power supply as claimed in claim 1, wherein the LED displaying light displaying a condition is selected from a group consisting of:
   a) a green light of the LED displaying light is lit representing a standby condition;
   b) the LED displaying light is extinguished representing that the power supply is abnormal and indicating one of the following conditions:
      i) a power supply circuit of the standby power source has faults;
      ii) overload; and
   c) a yellow indicator is lit up, then a user can not detect by himself; namely:
      i) when pressing a detecting button to engage a detecting switch, a yellow light lighting and the green light extinguishing represents that the power source is normal;
      ii) when pressing a detecting button, the green light remaining lit indicates that the power source is abnormal.

3. A computer power supply with a rapid self-error-check circuit, comprising: a self-detecting device; an LED displaying light and detecting button protrude from a casing of the computer power supply; thereby, the normality of the power supply is detected by pressing a detecting button and then the result is displayed through colors of the LED displaying light, the self-detecting device having a power supply operation detecting circuit and a power supply standby power source detecting circuit, wherein the power supply operation detecting circuit includes an AC power input end, a detecting switch, a rectifier, a power system, one of an auxiliary power source and standby power source, and a detector; the detector detects the power condition of a power system, and detects output voltage; the detected result is displayed by the LED displaying light, wherein the power supply standby power source detecting circuit includes an AC power input end, a detecting switch, a rectifier, a power system one of an auxiliary power source and a standby power source, and a detector; the detector detects the power condition of a power system, and detects output voltage; a detected result is displayed by the LED displaying light, wherein the following conditions are included:
   a) a green light is lit representing that one of the auxiliary power source and the standby power source is normal; and
   b) the LED displaying light is extinguished representing no auxiliary power source and standby power source, including conditions of:
      i) no AC input;
      ii) no fault in power wire; and
      iii) when output load being larger than 130%–160%, the detector informing to interrupt power supply; and improper load being removed, and the power being restored.

* * * * *